US012739088B2

(12) United States Patent
Huang et al.

(10) Patent No.: US 12,739,088 B2
(45) Date of Patent: Sep. 15, 2026

(54) ENHANCED ACTIVATION OF PRE-CONFIGURED MEASUREMENT GAPS FOR WIRELESS COMMUNICATIONS

(71) Applicant: INTEL CORPORATION, Santa Clara, CA (US)

(72) Inventors: Rui Huang, Beijing (CN); Candy Yiu, Portland, OR (US); Meng Zhang, Beijing (CN); Andrey Chervyakov, Maynooth (IE); Hua Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 189 days.

(21) Appl. No.: 18/575,827

(22) PCT Filed: Nov. 7, 2022

(86) PCT No.: PCT/US2022/049128
§ 371 (c)(1),
(2) Date: Dec. 30, 2023

(87) PCT Pub. No.: WO2023/086296
PCT Pub. Date: May 19, 2023

(65) Prior Publication Data

US 2024/0297773 A1 Sep. 5, 2024

Related U.S. Application Data

(60) Provisional application No. 63/297,991, filed on Jan. 10, 2022, provisional application No. 63/277,495, filed on Nov. 9, 2021.

(51) Int. Cl.
*H04L 5/00* (2006.01)
*H04W 24/10* (2009.01)

(52) U.S. Cl.
CPC ........... *H04L 5/0098* (2013.01); *H04W 24/10* (2013.01)

(58) Field of Classification Search
CPC ...... H04L 5/0098; H04L 5/001; H04W 24/10; H04W 36/0088
See application file for complete search history.

(56) References Cited

U.S. PATENT DOCUMENTS

2015/0124728 A1* 5/2015 Bergstrom .............. H04L 5/001 370/329
2016/0248533 A1 8/2016 Li et al.
(Continued)

FOREIGN PATENT DOCUMENTS

WO 2020259789 A1 12/2020
WO WO-2023060576 A1 * 4/2023 .............. H04W 8/24

OTHER PUBLICATIONS

Tao, "Method and Apparatus for Sending or Receiving Capability Indication Information, and Device and Medium", Apr. 20, 2023, WO, WO 2023060576 (Year: 2023).*
(Continued)

*Primary Examiner* — Michael K Phillips
(74) *Attorney, Agent, or Firm* — Gray Ice Higdon, PLLC

(57) ABSTRACT

This disclosure describes systems, methods, and devices for activating and deactivating pre-configured measurement gaps in carrier aggregation. A user equipment (UE) device may detect a pre-configured measurement gap configured by a network; detect that the pre-configured measurement gap has been activated or deactivated; and activate or deactivate the measurement gap based on the detection that the pre-configured measurement gap has been activated or deactivated.

20 Claims, 15 Drawing Sheets

(56) References Cited

U.S. PATENT DOCUMENTS

| | | | | |
|---|---|---|---|---|
| 2022/0132348 | A1* | 4/2022 | Orsino | H04W 76/27 |
| 2023/0077965 | A1* | 3/2023 | Abraham | H04W 24/10 370/252 |
| 2023/0337023 | A1* | 10/2023 | Li | H04W 24/10 |
| 2024/0080694 | A1* | 3/2024 | Yang | H04W 36/0088 |
| 2024/0236750 | A1* | 7/2024 | Hu | H04W 76/15 |
| 2024/0259853 | A1* | 8/2024 | El Hamss | H04W 24/10 |
| 2024/0276277 | A1* | 8/2024 | Yamamoto | H04W 76/20 |

OTHER PUBLICATIONS

Intel Corporation, "Discussion on pre-configured measurement gap", Nov. 1-12, 2021, 3GPP, R4-2118013 (Year: 2021).*

Intel Corporation et al., "Email discussion summary for [100-e][222] NR_MG_Part_2", Nov. 1-12, 2021, 3GPP, R4-2120217 ( Year: 2021).*

Huawei et al., "Discussion on pre-configured MG", Nov. 1-12, 2021, 3GPP, R4-2119349 (Year: 2021).*

International Search Report and Written Opinion mailed Mar. 15, 2023 in Application No. PCT/US2022/049128, 11 pages.

3GPP TSG RAN WG4 Meeting #101-e, "Email discussion summary for [100-e][222] NR_MG_Part_2," R4-2120217, Nov. 1-12, 2021, 48 pages.

3GPP TSG-RAN WG4, Meeting #101e, "Discussion on pre-configured MG," R2119349, Nov. 1-12, 2021, 11 pages.

3GPP TSG-RAN WG4 Meeting #99-e, "Discussion on pre-configured gap," R2109180, May 19-27, 2021, 5 pages.

International Preliminary Report on Patentability mailed May 23, 2024 in Application No. PCT/US2022/049128, 8 pages.

* cited by examiner

600

| | | | SCell deactivated | | | | | MAC CE for SCell activation | SCell activated | | | | Notes |
|---|---|---|---|---|---|---|---|---|---|---|---|---|---|
| | BWP index | | 0 | 1 | 2 | 3 | Notes | | 0 | 1 | 2 | 3 | |
| Gap needs for pre-MG ON/OFF | MO#1 | | 0 | / | / | / | | | 0 | 1 | 1 | 1 | |
| | | | NA | / | / | / | Decativated | | 1 | 1 | 1 | 1 | |
| | MO#2 | | / | / | / | / | for UE with PCell, measurement on f1 is inter-f | | | | | | No BWP switching |
| | | | / | / | / | / | Decativated | | 0 | 1 | 1 | 1 | No BWP switching |
| | per-UE | | 0 | / | / | / | | | 0 | | | | pre-MG status unchanged. |

| | | | SCell deactivated | | | | | MAC CE for SCell activation | SCell activated | | | | Notes |
|---|---|---|---|---|---|---|---|---|---|---|---|---|---|
| | BWP index | | 0 | 1 | 2 | 3 | Notes | | 0 | 1 | 2 | 3 | |
| Gap needs for | MO#1 | | 1 | / | / | / | | | 1 | 1 | 1 | 1 | |
| | | | NA | / | / | / | Deactivated | | 1 | 1 | 1 | 1 | |
| | MO#2 | | / | / | / | / | for UE with PCell, measurement on f1 is inter-f | | | | | | No BWP switching |
| | | | / | / | / | / | Deactivated | | 0 | 1 | 1 | 1 | No BWP switching |
| pre-MG ON/OFF | per-UE | | 1 | / | / | / | | | 1 | | | | pre-MG status unchanged |

| | | | SCell deactivated | | | | | MAC CE for SCell activation | SCell activated | | | | Notes |
|---|---|---|---|---|---|---|---|---|---|---|---|---|---|
| | BWP index | | 0 | 1 | 2 | 3 | Notes | | 0 | 1 | 2 | 3 | |
| Gap neede for pre-MG ON/OFF | MO#1 | | 1 | / | / | / | | | 1 | 1 | 1 | 1 | |
| | | | NA | / | / | / | Decativated | | 0 | 1 | 1 | 1 | |
| | MO#2 | | / | / | / | / | for UE with PCell, measurement on f1 is inter-f | | | | | | No BWP switching |
| | | | / | / | / | / | Decativated | | 0 | 1 | 1 | 1 | No BWP switching |
| | per-UE | | 1 | / | / | / | | | 0 | | | | pre-MG status changed. |

| | | | SCell deactivated | | | | | MAC_CE for Scell activation | SCell activated | | | | Notes |
|---|---|---|---|---|---|---|---|---|---|---|---|---|---|
| BWP index | | | 0 | 1 | 2 | 3 | Notes | | 0 | 1 | 2 | 3 | |
| Gap neede for | MO#1 | UE activated BWP in f0 | 0 | 1 | 1 | 1 | | | 0 | 1 | 1 | 1 | BWP switching in 1 CC only |
| | | UE activated BWP in f1 | / | / | / | / | | | 1 | 1 | 1 | 1 | BWP switching in 1 CC only |
| pre-MG ON/OFF per UE | | | 0 | / | / | / | | | [illegible] | 1 | 1 | 1 | pre-MG status [illegible] |

| | | | SCell deactivated | | | | | MAC_CE for SCell activated | SCell activated | | | | Notes |
|---|---|---|---|---|---|---|---|---|---|---|---|---|---|
| BWP index | | | 0 | 1 | 2 | 3 | Notes | | 0 | 1 | 2 | 3 | |
| Gap neede for | MO#1 | UE activated BWP in f0 | 1 | 1 | 1 | 1 | | | 1 | 1 | 1 | 1 | BWP switching in 1 CC only |
| | | UE activated BWP in f1 | / | / | / | / | | | 0 | 1 | 1 | 1 | BWP switching in 1 CC only |
| pre-MG ON/OFF per UE | | | 1 | 1 | 1 | 1 | | | 0 | 1 | 1 | 1 | pre-MG status changed. |

| | | | SCell deactivated | | | | | MAC_CE for SCell activati | SCell activated | | | | Notes |
|---|---|---|---|---|---|---|---|---|---|---|---|---|---|
| BWP index | | | 0 | 1 | 2 | 3 | Notes | | 0 | 1 | 2 | 3 | |
| Gap neede for | MO#1 | UE activated BWP in f0 | 1 | 1 | 1 | 1 | | | 1 | 1 | 1 | 1 | BWP switching in 1 CC only |
| | | UE activated BWP in f1 | / | / | / | / | | | 1 | 1 | 1 | 1 | BWP switching in 1 CC only |
| pre-MG ON/OFF per UE | | | 1 | 1 | 1 | 1 | | | [illegible] | 1 | 1 | 1 | pre-MG status |

FIG. 6F

ENHANCED ACTIVATION OF PRE-CONFIGURED MEASUREMENT GAPS FOR WIRELESS COMMUNICATIONS

CROSS-REFERENCE TO RELATED APPLICATION(S)

This application is a U.S. National Stage Application under 35 U.S.C. 371 and claims the priority benefit of International Application No. PCT/US2022/049128, filed Nov. 7, 2022, and claims the benefit of U.S. Provisional Application No. 63/277,495, filed Nov. 9, 2021, and U.S. Provisional Application No. 63/297,991, filed Jan. 10, 2022, the disclosures of which are incorporated by reference as set forth in full.

TECHNICAL FIELD

This disclosure generally relates to systems and methods for wireless communications and, more particularly, to activating pre-configured measurement gaps in wireless communications.

BACKGROUND

Wireless devices are becoming widely prevalent and are increasingly using wireless channels. The 3$^{rd}$ Generation Partnership Program (3GPP) is developing one or more standards for wireless communications.

BRIEF DESCRIPTION OF THE DRAWINGS

FIG. 6A is a table of parameters for Case 4-1, in accordance with one or more example embodiments of the present disclosure.

FIG. 6B is a table of parameters for Case 4-2, in accordance with one or more example embodiments of the present disclosure.

FIG. 6C is a table of parameters for Case 4-3, in accordance with one or more example embodiments of the present disclosure.

FIG. 6D is a table of parameters for Case 5-1, in accordance with one or more example embodiments of the present disclosure.

FIG. 6E is a table of parameters for Case 5-2, in accordance with one or more example embodiments of the present disclosure.

FIG. 6F is a table of parameters for Case 5-3, in accordance with one or more example embodiments of the present disclosure.

DETAILED DESCRIPTION

Figure 1:
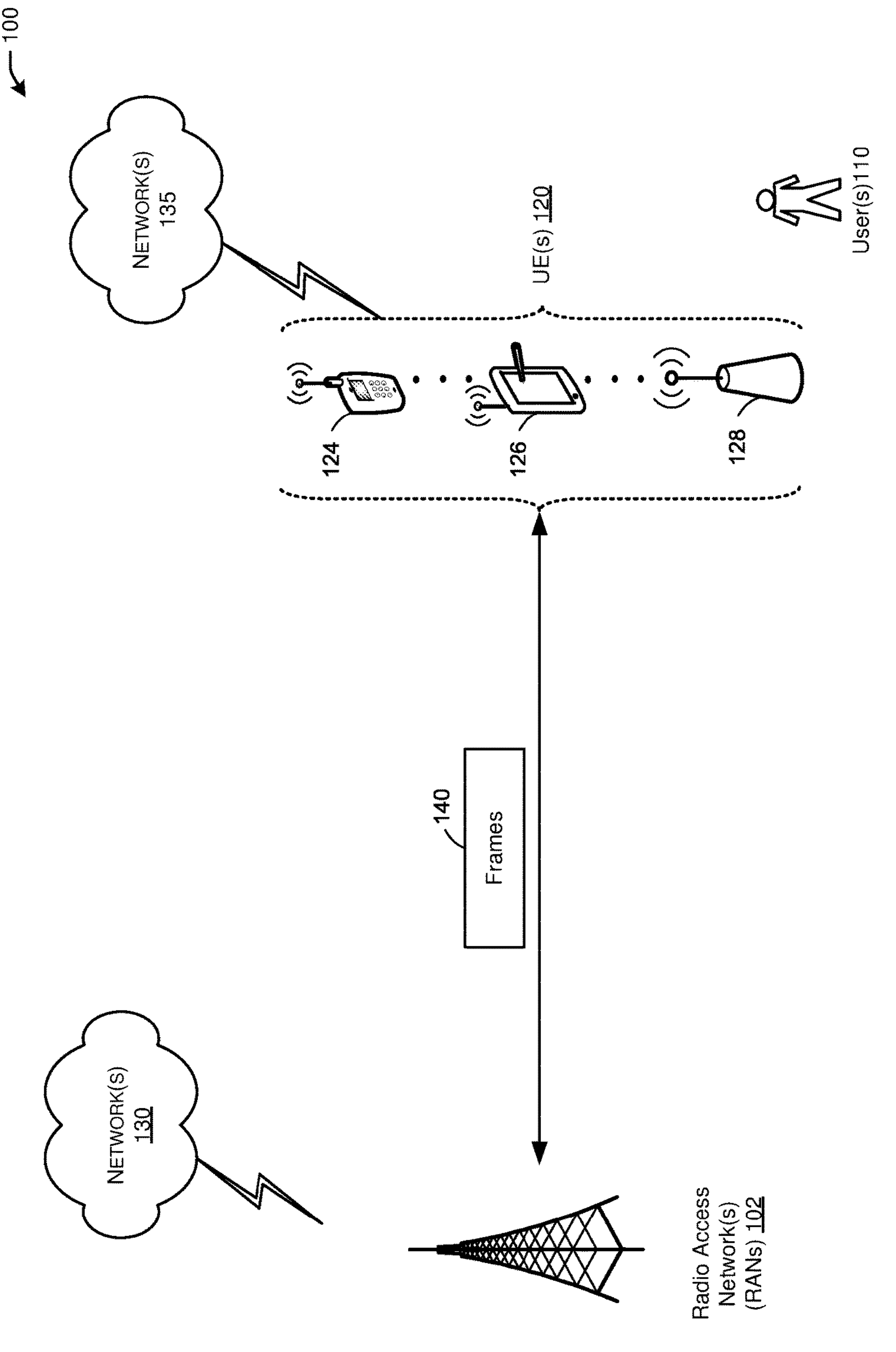
FIG. 1 is a network diagram illustrating an example network environment, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Wireless devices may operate as defined by technical standards. For cellular telecommunications, the 3$^{rd}$ Generation Partnership Program (3GPP) define communication techniques, including the use of measurement gaps, which refer to a small gap in time during which no transmission or reception happens. During this small gap, a user equipment device (UE) may perform a signal quality measurement (e.g., on a target cell before returning to a current cell). The 3GPP standards provide for an agreement between the UE and the network to define a measurement gap (MG), including a starting position of the MG, a MG length in time, a number of MGs, and the like (e.g., established by a MG configuration element of a radio resource control message).

The pre-configured measurement gap procedure is used by the network to provide a measurement gap for downlink position reference signal (DL-PRS) measurements. The gNB network device may activate/deactivate the pre-configured measurement gap upon receiving the request from a UE or a location management function (LMF).

A UE uses MGs to perform measurements on a target carrier frequency (e.g., target cell) while simultaneously transmitting and/or receiving on a serving cell. The MGs may be pre-configured by the network (e.g., gap-assisted) or non-gap-assisted. The measurements may be performed on SSBs of the target cells.

Previously, a configured MG was always active, but newer pre-configured MGs may activate conditionally.

In one or more embodiments of the present disclosure, UE behavior may be defined for when the network transforms a pre-configured MG to other MGs.

In one or more embodiments, if the pre-configured MG was configured to UE, the measurement objects changed by RRC can trigger the pre-configured MG status (ON/OFF) changed.

Case 1-1→No Need to Trigger UE Check Pre-MG Status Autonomously.

When a measurement object (MO) is being reconfigured, the pre-MG can be reconfigured together. And the indication on the pre-MG activation status can be updated together.

For UEs that support NW signaling based pre-configured MG status indication can check the further pre-MG status by NW signaling.

For UEs that do not support NW signaling based pre-configured MG status indication but the rule based, NW will also activate pre-MG at, but not forward any indication to, the UE. UE need not autonomously know the pre-MG status because they are already included in RRCReconfiguation message 2.

Case 1-2.→Need to Trigger UE Check Pre-MG Status Autonomously when Such Event Happens.

Alternatively, if there is no any updates on preMG configuration in MO reconfiguration message, For signaling based, at least such indication table shall be updated and forward to UE.

For rule based, UE may need to be triggered to update the knowledge about pre-MG status.

In one or more embodiments, the pre-configured MG status may be based on a PSCell/SCell adding/release/change. If the pre-configured MG was configured to UE, the PSCell/SCell adding/release/change by RRC can trigger the pre-configured MG status (ON/OFF) changed.

Case 2-1→No Need to Trigger UE Check Pre-MG Status Autonomously

When PSCell/SCell adding/change by RRC, the pre-MG can be reconfigured together. And the indication on the pre-MG activation status can be updated together.

For a UE that supports NW signaling based pre-configured MG status indication can check the further pre-MG status by NW signaling.

For a UE that does not support NW signaling based pre-configured MG status indication but the rule based, NW will also activate pre-MG at, but not forward any indication to, the UE. UE need not autonomously know the pre-MG status because they are already included in RRCReconfiguation message 2.

Case 2-2.→Need to Trigger UE Check Pre-MG Status Autonomously when Such Event Happened Alternatively, if there is not any update on a preMG configuration in a MO reconfiguration message:

For signaling based, at least such indication table shall be updated and forward to UE.

For rule based, the UE needs to be triggered to update the knowledge about pre-MG status.

In one or more embodiments, SCell activation may be a basis for triggering the pre-configured MG status.

Case 3-1: Need to Trigger UE Check Pre-MG Status Autonomously when Such Event Happened If the pre-configured MG was configured to UE, the SCell activation is by MAC-CE. If the pre-configured MG activation status are pre-known by UE considering all SCells candidates, NW and UE needs to check pre-configured MG status when MAC-CE of SCell activation received.

In one or more embodiments, rules of for UE autonomous Pre-MG (pre-configured MG) activation/deactivation may be:

The trigger events that may change the activation status of pre-MG configured to UE include:

BWP switching, adding/removing any measurement object(s): FFS;

adding/releasing/changing SCell(s): FFS;

activating/de-activating any Scell(s): FFS.

In one or more embodiments, for the trigger event themselves the following conditions which are triggered by RRC messages may not be feasible. When some RRC messages are being forwarded to UE, the necessary updates on the measurement gap configuration can be forwarded to UE simultaneously. The benefits of pre-MG which can reduce the gap configuration time will be diminished.

In one or more embodiments, in case of MO configuration being changed, the pre-MG can be reconfigured together within an IE for MO (e.g., RRCReconfiguation). The new indication on the pre-MG activation status can be updated as well. The network will also activate pre-MG.

In one or more embodiments, for singling-based triggering, the pre-MG status indication updated may be forward to UE within the RRC message for MG configuration. For rule-based pre-MG activation status indication, the network may not forward any indication to UE. However, UE may not need to autonomously identify the pre-MG status because the status may be included in RRCReconfiguation message.

In one or more embodiments, if there are no updates on preMG configuration in a MO reconfiguration message, for signaling based triggering, at least an indication table may be updated and forward to the UE. For rule based triggering, the UE may need to be triggered to update the knowledge about pre-MG status.

```
RRCReconfiguration-IEs ::=                SEQUENCE {
  radioBearerConfig                       RadioBearerConfig                OPTIONAL,
-- Need M
  secondaryCellGroup                      OCTET STRING (CONTAINING CellGroupConfig)
OPTIONAL, -- Cond SCG
  measConfig                              MeasConfig                       OPTIONAL,
-- Need M
  lateNonCriticalExtension                OCTET STRING                     OPTIONAL,
  nonCriticalExtension                                        RRCReconfiguration-v1530-IEs
OPTIONAL
}
MeasConfig ::=                      SEQUENCE {
  measObjectToRemoveList                                      MeasObjectToRemoveList
OPTIONAL, -- Need N
  measObjectToAddModList                                      MeasObjectToAddModList
OPTIONAL, -- Need N
  reportConfigToRemoveList                                    ReportConfigToRemoveList
OPTIONAL, -- Need N
  reportConfigToAddModList                                    ReportConfigToAddModList
OPTIONAL, -- Need N
  measIdToRemoveList                      MeasIdToRemoveList               OPTIONAL,
```

-continued

```
-- Need N
  measIdToAddModList                        MeasIdToAddModList              OPTIONAL,
-- Need N
  s-MeasureConfig                         CHOICE {
      ssb-RSRP                          RSRP-Range,
      csi-RSRP                          RSRP-Range
    }                                                          OPTIONAL,   -- Need M
  quantityConfig                        QuantityConfig                      OPTIONAL,
-- Need M
     measGapConfig                        MeasGapConfig                     OPTIONAL,
-- Need M
    preMGActivationStatus
  measGapSharingConfig                      MeasGapSharingConfig            OPTIONAL,
-- Need M
  ...,
  [[
  interFrequencyConfig-NoGap-r16                                 ENUMERATED {true}
OPTIONAL    -- Need R
  ]]
         }
```

In one or more embodiments, triggering may be for a single CC with one MO. The common configuration parameters for the cases under this scenario are listed below:

PCell @f0, BWP0, Four Candidate BWPs.

Case 1-1: MO #1, Intra-f: @f0, BWP0, SSB/CSI-RS.

TABLE 1

| BWP Status for Pre-MG | | | | |
|---|---|---|---|---|
| | Switch to | | | |
| | BWP0 (initial status) | BWP1 | BWP2 | BWP3 |
| Gap needed for UE measurements | 0 | 1 | 1 | 1 |
| Pre-MG on/off | 0 | 1 | 1 | 1 |

Case 1-2: MO #1, Intra-f: @f0, BWP1 (Different with UE Initial Active BWP), SSB/CSI-RS.

TABLE 2

| BWP Status for Pre-MG | | | | |
|---|---|---|---|---|
| | Switch to | | | |
| | BWP0 (initial status) | BWP1 | BWP2 | BWP3 |
| Gap needed for UE measurements | 1 | 0 | 1 | 1 |
| Pre-MG on/off | 1 | 0 | 1 | 1 |

In one or more embodiments, for a single CC scenario, BWP switching may trigger the pre-MG status transition.

Scenario 2: Single CC, >1 MO:

The common configuration parameters for the cases under this scenario are listed below:

PCell @f0, BWP0, four candidate BWPs.

Case2-1:

MO #1, intra-f: @f0, BWP0, SSB;

MO #2, intra-f: @f0, BWP0, SSB.

TABLE 3

| BWP Status for Pre-MG | | | | |
|---|---|---|---|---|
| Switch to | BWP0 | BWP1 | BWP2 | BWP3 |
| Gap needed for MO#1(N1) | 0 | 1 | 1 | 1 |
| Gap needed for MO#2(N2) | 0 | 1 | 1 | 1 |
| Gap needed for any of MOs | 0 | 1 | 1 | 1 |
| Pre-MG on/off(N1 or N2) | 0 | 1 | 1 | 1 |

In one or more embodiments, if the multiple MOs are in a same frequency layer (e.g., including the BWP), the possible pre-MG status transition may be the same as for Scenario 1.

Case2-2:

MO #1, intra-f: @f0, BWP0, SSB;

MO #2, intra-f with gap: @f0, BWP1, SSB.

TABLE 4

| BWP Status for Pre-MG | | | | |
|---|---|---|---|---|
| Switch to | BWP0 | BWP1 | BWP2 | BWP3 |
| Gap needed for MO#1(N1) | 0 | 1 | 1 | 1 |
| Gap needed for MO#2(N2) | 1 | 0 | 1 | 1 |
| Gap needed for any of MOs | 1 | 1 | 1 | 1 |
| Pre-MG on/off(N1 or N2) | 1 | 1 | 1 | 1 |

Case2-3:

MO #1, intra-f: @f0, BWP0, SSB;

MO #2, inter-f with gap: @f1, BWP1, SSB.

TABLE 5

| BWP Status for Pre-MG | | | | |
|---|---|---|---|---|
| Switch to | BWP0 | BWP1 | BWP2 | BWP3 |
| Gap needed for MO#1(N1) | 0 | 1 | 1 | 1 |
| Gap needed for MO#2(N2) | 1 | 1 | 1 | 1 |
| Gap needed for any of MOs | 1 | 1 | 1 | 1 |
| Pre-MG on/off(N1 or N2) per UE | 1 | 1 | 1 | 1 |

In one or more embodiments, for single CC with multiple MOs, Pre-MG (de)activation status may be changed when BWP switching if all MOs can be contained within UE's activated BWP before or after UE active BWP switching.

Scenario 3: CA: Multiple CC, Single BWP switching happened in PCell/PSCells/SCells, no Scell activation/deactivation.

The common configuration parameter for the cases below are:

PCell @f0, BWP0, SCell @f1, BWP0, Four Candidate BWPs.

Case3-1:

PCell @f0 and SCell@f1 are activated

MO #1, intra-f: @f0, BWP0, SSB).

TABLE 6

| | BWP Status for Pre-MG | | | |
|---|---|---|---|---|
| | BWP Switch to (only in single CC (e.g. PCell)) | | | |
| | BWP0 (initial status) | BWP1 | BWP2 | BWP3 |
| Gap needed for UE measurements | 0 | 1 | 1 | 1 |
| Pre-MG on/off | 0 | 1 | 1 | 1 |

Case 3-2:

MO #1, intra-f: @f0, BWP0, SSB;

MO #2, intra-f: @f1, BWP0, SSB.

TABLE 7

| | BWP Status for Pre-MG | | | |
|---|---|---|---|---|
| | BWP Switch to (only in single CC (e.g. PCell)) | | | |
| | BWP0 (initial status) | BWP1 | BWP2 | BWP3 |
| Gap needed for UE measurements on MO#1(N1) | 0 | 1 | 1 | 1 |
| Gap needed for UE measurements on MO#2(N2) | 0 | / | / | / |
| Gap needed for any of MOs | 0 | 1 | 1 | 1 |
| Pre-MG on/off(N1 or N2) | 0 | 1 | 1 | 1 |

In one or more embodiments, for MO #2 it is in same frequency layer as UE's activated BWP in other SCell. Since only single BWP switching allowed, so for MO #2 a UE that needs to be on the activated gap can remain as the initial status.

Case 3-3:

PCell @f0 and SCell@f1 are activated;

MO #1, intra-f: @f0, BWP0, SSB;

MO #2, intra-f: @f1, BWP1, SSB.

TABLE 8

| | BWP Status for Pre-MG | | | |
|---|---|---|---|---|
| | BWP Switch to (only in single CC (e.g. PCell)) | | | |
| | BWP0 (initial status) | BWP1 | BWP2 | BWP3 |
| Gap needed for UE measurements on MO#1(N1) | 0 | 1 | 1 | 1 |
| Gap needed for UE measurements on MO#2(N2) | / | 0 | / | / |
| Gap needed for any of MOs | 0 | 0 | 1 | 1 |
| Pre-MG on/off(N1 or N2) | 0 | 0 | 1 | 1 |

In one or more embodiments, for a CA scenario without SCell activation, pre-MG status when BWP switching may be changed if the MOs' frequency layer may not be contained within UE's activated BWP of either PCell or SCell.

In one or more embodiments, pre-MG triggering may occur with multiple CCs with SCell activation/deactivation only. The common configuration parameter for the cases below are:

PCell @f0, BWP0, SCell @f1, BWP0, Four Candidate BWPs.

In one or more embodiments, when SCell activation is trigged by MAC-CE, the association between the pre-MG and the BWP may be changed. The possible rules to activate the pre-MG may be updated accordingly.

Case 4-1:

MO #1, intra-f: @f0, BWP0, SSB.

In one or more embodiments, when SCell activation happens only (e.g., no BWP switching), after pre-MG configured, if MO can be contained by either of PCell or other activated SCells' activated BWP, the pre-MG status can be unchanged.

Case 4-2:

MO #1, intra-f: @f0, BWP1, SSB.

In one or more embodiments, when SCell activation happens only (e.g., no BWP switching), after pre-MG configured, if MO cannot be contained by either of PCell or other activated SCells' activated BWP, pre-MG activated is always needed during the SCell being activated.

In one or more embodiments, when SCell activation happens after pre-MG is configured, if MO cannot be contained by UE's activated BWP on SCell to be activated, the pre-MG status can be unchanged.

Case 4-3:

MO #1, intra-f: @f1, BWP0, SSB.

In one or more embodiments, when SCell activation happens after pre-MG is configured, if MO is not contained by UE's activate BWP in either PCell or other SCells being activated, but by the UE's activated BWP in the SCell to be activated, the pre-MG activation status can be changed.

In one or more embodiments, there may be multiple CCs with both Scell activation/deactivation and BWP switching (e.g., only single BWP switching happened in PCell).

The common configuration parameter for all cases below are:

PCell @f0, BWP0, SCell @f1, BWP0, Four Candidate BWPs.

Case 5-1:

MO #1, intra-f: @f0, BWP0, SSB;

BWP switching in PCell @f0;

deactivation→activation @f1.

In one or more embodiments, when MO can be contained by UE's activated BWP in PCC, there may not be any impact on the pre-MG status from the SCell activation, but only from the activated BWP switching in PCC.

Case 5-2:

MO #1: intra-f: @f1, BWP0, SSB;
BWP switching in PCell @f0;
deactivation→activation @f1.

In one or more embodiments, when MO can be contained by UE's activated BWP in the SCC to be activated, there is impact on the pre-MG status from the SCell activation.

Case 5-3:

MO #1, inter-f(after activation): @f2, BWP0, SSB;
MO #2: NA
deactivation→activation @f1.

In one or more embodiments, when MO cannot be contained by UE's activated BWP in any PCell/SCell kept as activation or to be activated, there will not be an impact on the pre-MG status from the SCell activation.

In one or more embodiments, in the case of a CA, the impact from the SCell (de)activation and the BWP switching can trigger the pre-MG status change independently.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment 100, in accordance with one or more example embodiments of the present disclosure.

Wireless network 100 may include one or more UEs 120 and one or more RANs 102 (e.g., gNBs), which may communicate in accordance with 3GPP communication standards. The UE(s) 120 may be mobile devices that are non-stationary (e.g., not having fixed locations) or may be stationary devices.

Figure 8:
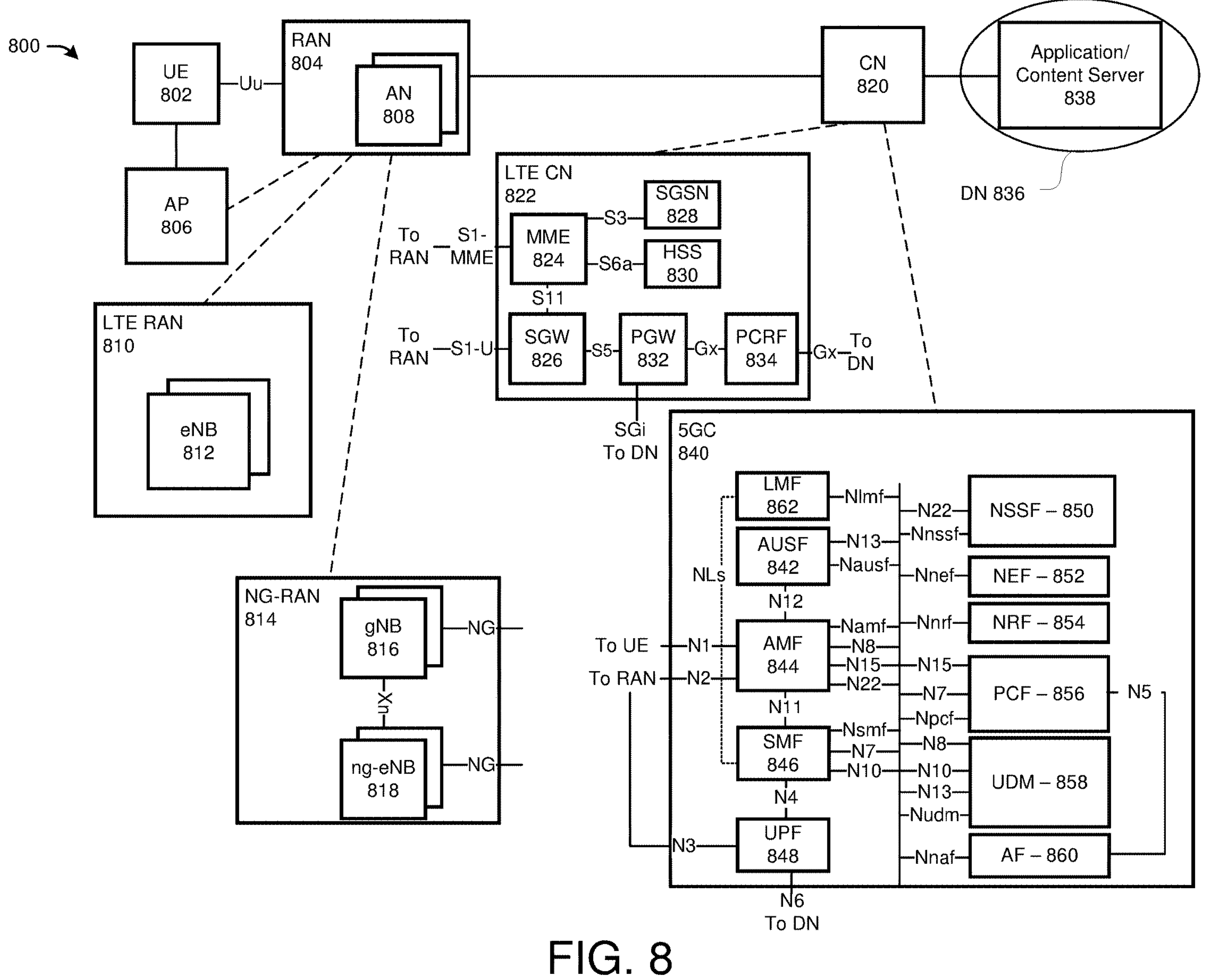
FIG. 8. illustrates a network, in accordance with one or more example embodiments of the present disclosure.
Figure 9:
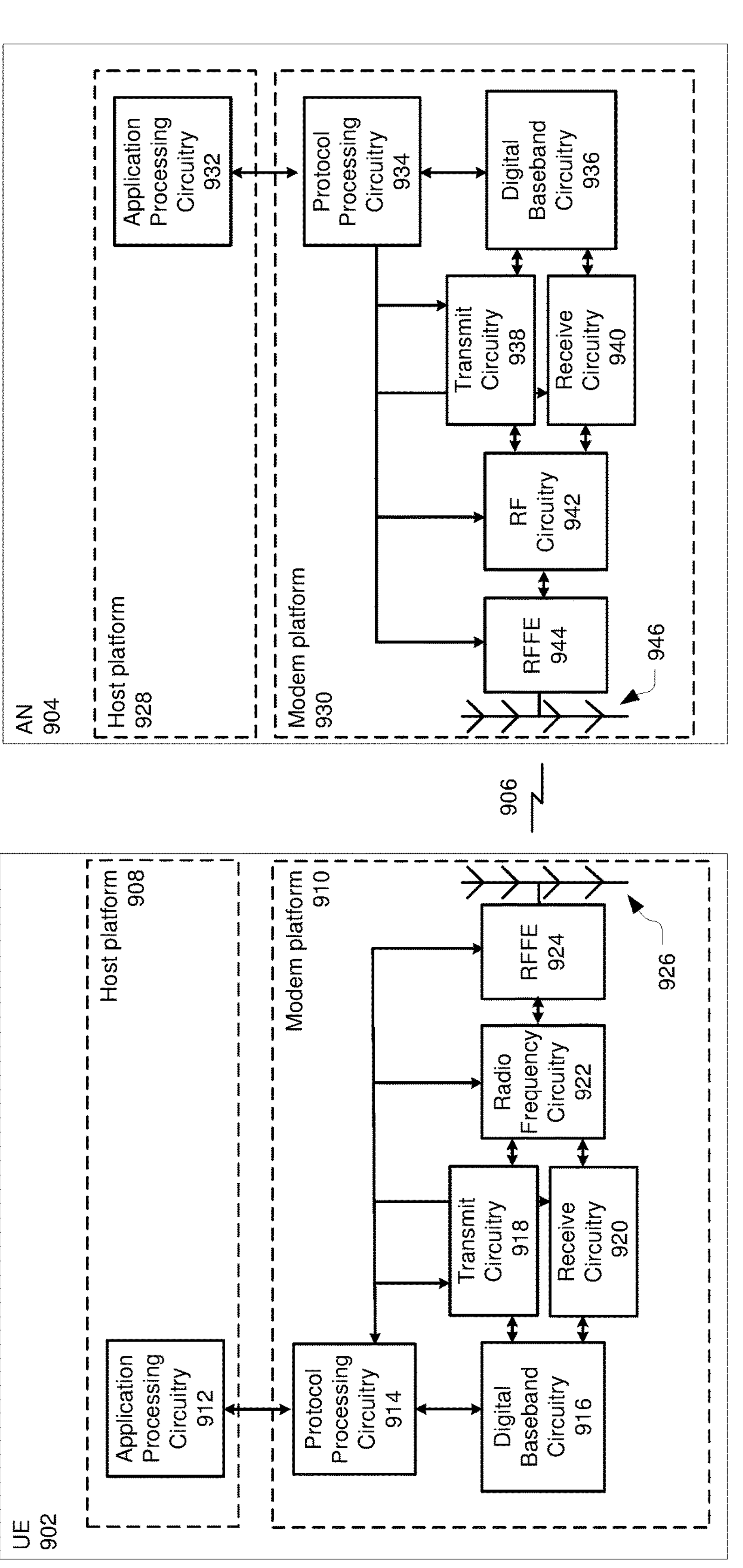
FIG. 9 schematically illustrates a wireless network, in accordance with one or more example embodiments of the present disclosure.
Figure 10:
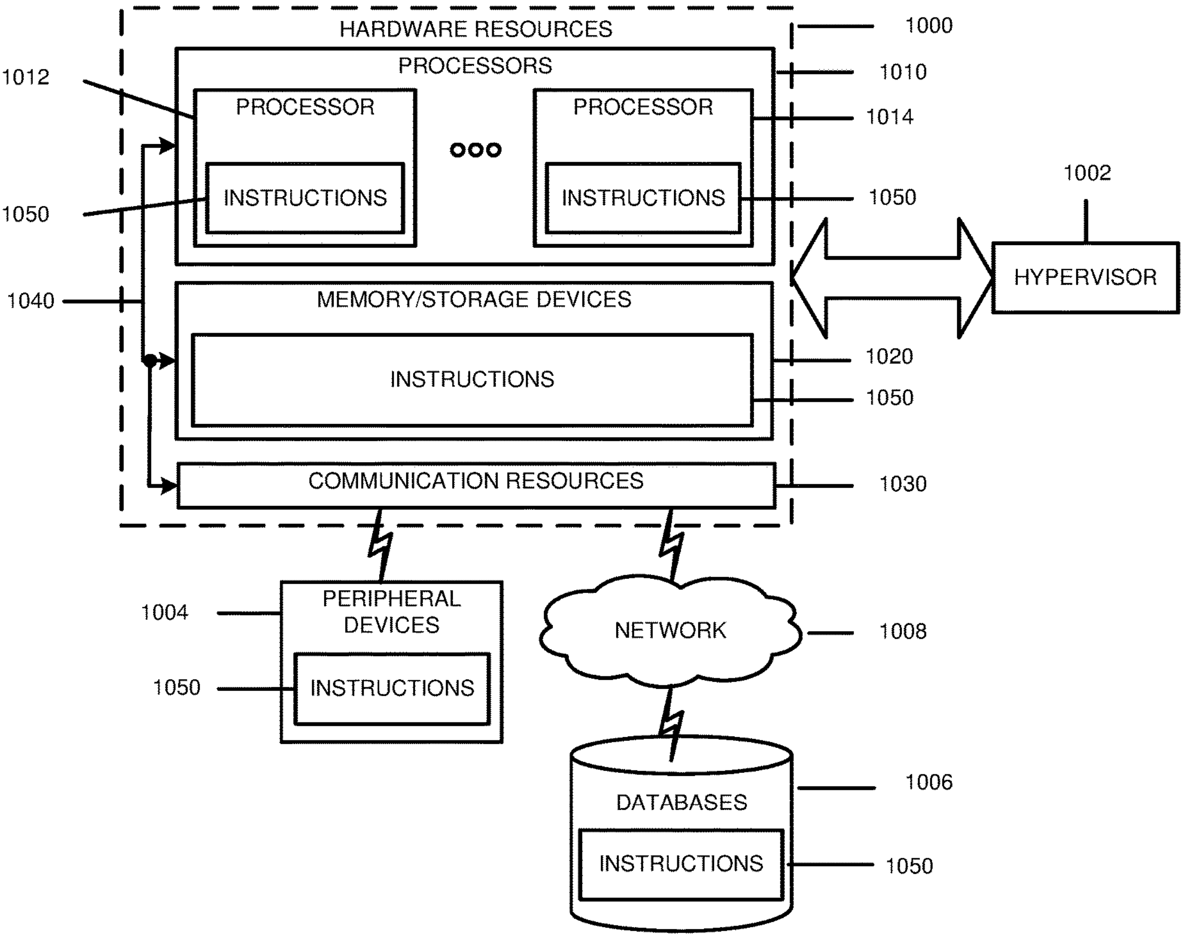
FIG. 10 is a block diagram illustrating components, in accordance with one or more example embodiments of the present disclosure.

In some embodiments, the UEs 120 and the RANs 102 may include one or more computer systems similar to that of FIGS. 8-10.

One or more illustrative UE(s) 120 and/or RAN(s) 102 may be operable by one or more user(s) 110. A UE may take on multiple distinct characteristics, each of which shape its function. For example, a single addressable unit might simultaneously be a portable UE, a quality-of-service (QOS) UE, a dependent UE, and a hidden UE. The UE(s) 120 (e.g., 124, 126, or 128) and/or RAN(s) 102 may include any suitable processor-driven device including, but not limited to, a mobile device or a non-mobile, e.g., a static device. For example, UE(s) 120 may include, a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

Any of the UE(s) 120 (e.g., UEs 124, 126, 128), and UE(s) 120 may be configured to communicate with each other via one or more communications networks 130 and/or 135 wirelessly or wired. The UE(s) 120 may also communicate peer-to-peer or directly with each other with or without the RAN(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, cellular networks. In addition, any of the communications networks 130 and/or 135 may include any type of medium over which network traffic may be carried including, but not limited to, coaxial cable, twisted-pair wire, optical fiber, a hybrid fiber coaxial (HFC)

medium, microwave terrestrial transceivers, radio frequency communication mediums, white space communication mediums, ultra-high frequency communication mediums, satellite communication mediums, or any combination thereof.

Any of the UE(s) 120 (e.g., UE 124, 126, 128) and RAN(s) 102 may include one or more communications antennas. The one or more communications antennas may be any suitable type of antennas corresponding to the communications protocols used by the UE(s) 120 (e.g., UEs 124, 126 and 128), and RAN(s) 102. Some non-limiting examples of suitable communications antennas include cellular antennas, 3GPP family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the UEs 120 and/or RAN(s) 102.

Any of the UE(s) 120 (e.g., UE 124, 126, 128), and RAN(s) 102 may be configured to perform directional transmission and/or directional reception in conjunction with wirelessly communicating in a wireless network. Any of the UE(s) 120 (e.g., UE 124, 126, 128), and RAN(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the UE(s) 120 (e.g., UE 124, 126, 128), and RAN(s) 102 may be configured to perform any given directional transmission towards one or more defined transmit sectors. Any of the UE(s) 120 (e.g., UE 124, 126, 128), and RAN(s) 102 may be configured to perform any given directional reception from one or more defined receive sectors.

MIMO beamforming in a wireless network may be accomplished using RF beamforming and/or digital beamforming. In some embodiments, in performing a given MIMO transmission, UE 120 and/or RAN(s) 102 may be configured to use all or a subset of its one or more communications antennas to perform MIMO beamforming.

Any of the UE 120 (e.g., UE 124, 126, 128), and RAN(s) 102 may include any suitable radio and/or transceiver for transmitting and/or receiving radio frequency (RF) signals in the bandwidth and/or channels corresponding to the communications protocols utilized by any of the UE(s) 120 and RAN(s) 102 to communicate with each other. The radio components may include hardware and/or software to modulate and/or demodulate communications signals according to pre-established transmission protocols. The radio components may further have hardware and/or software instructions to communicate via one or more 3GPP protocols and using 3GPP bandwidths. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one or more embodiments, and with reference to FIG. 1, one or more of the UE 120 may exchange frames 140 with the RANs 102. The frames 140 may include RRC messages, indications of MO changes, primary and secondary cell additions, releases, changes, activations, and the like with regard to triggering activation of pre-configured MGs as described herein.

It is understood that the above descriptions are for purposes of illustration and are not meant to be limiting.

Figure 2:
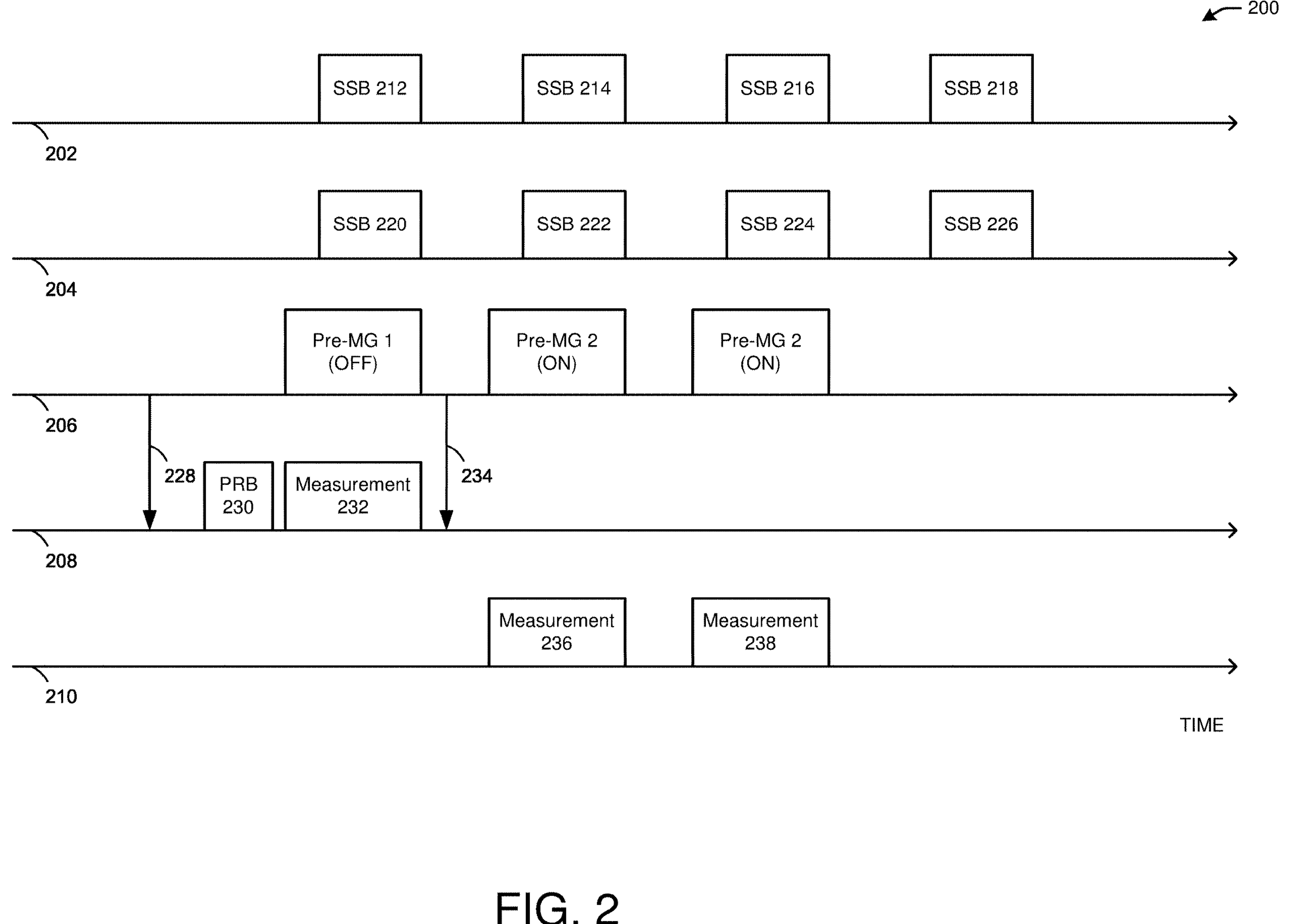
FIG. 2 illustrates an example process of triggering a pre-configured measurement gap activation or deactivation using a measurement object reconfiguration, in accordance with one or more example embodiments of the present disclosure.

FIG. 2 illustrates an example process 200 of triggering a pre-configured measurement gap activation or deactivation using a measurement object reconfiguration, in accordance with one or more example embodiments of the present disclosure.

Referring to FIG. 2, the process 200 may include a UE (e.g., of the UEs 120 of FIG. 1) using a measurement object 202 (e.g., a neighboring cell 1 transmitting at frequency f0), a measurement object 204 (e.g., a neighboring cell 2 transmitting at frequency f1), a serving cell 206 (e.g., transmitting at frequency f0), a UE receiving frequency 208 using frequency f0, and a UE receiving frequency 210 using frequency f1. The neighboring cell 1 may receive SSBs 212, 214, 216, and 218 (e.g., from the RANs 102 of FIG. 1). The neighboring cell 2 may receive SSBs 220, 222, 224, and 226 (e.g., from the RANs 102 of FIG. 1). The serving cell 206 may indicate 228 to the UE receiving frequency 208, using a RRC reconfiguration of an RRC message, that a pre-configured MG 1 has been configured, and the UE receiving frequency 208 may use an in-BWP PRB 230. The UE may perform a measurement 232 without a MG during a pre-MG 1 in the serving cell 206. The serving cell 206 may indicate 234 to the UE receiving frequency 208 a measurement object reconfiguration (e.g., using a RRC reconfiguration message to indicate a pre-MG 2). The measurement object reconfiguration may trigger a pre-MG 2 in the serving cell 206, during which the UE may perform a measurement 236 in the UE receiving frequency 210, and a later pre-MG 2 during which the UE may perform a measurement 238 in the UE receiving frequency 210.

Figure 3:
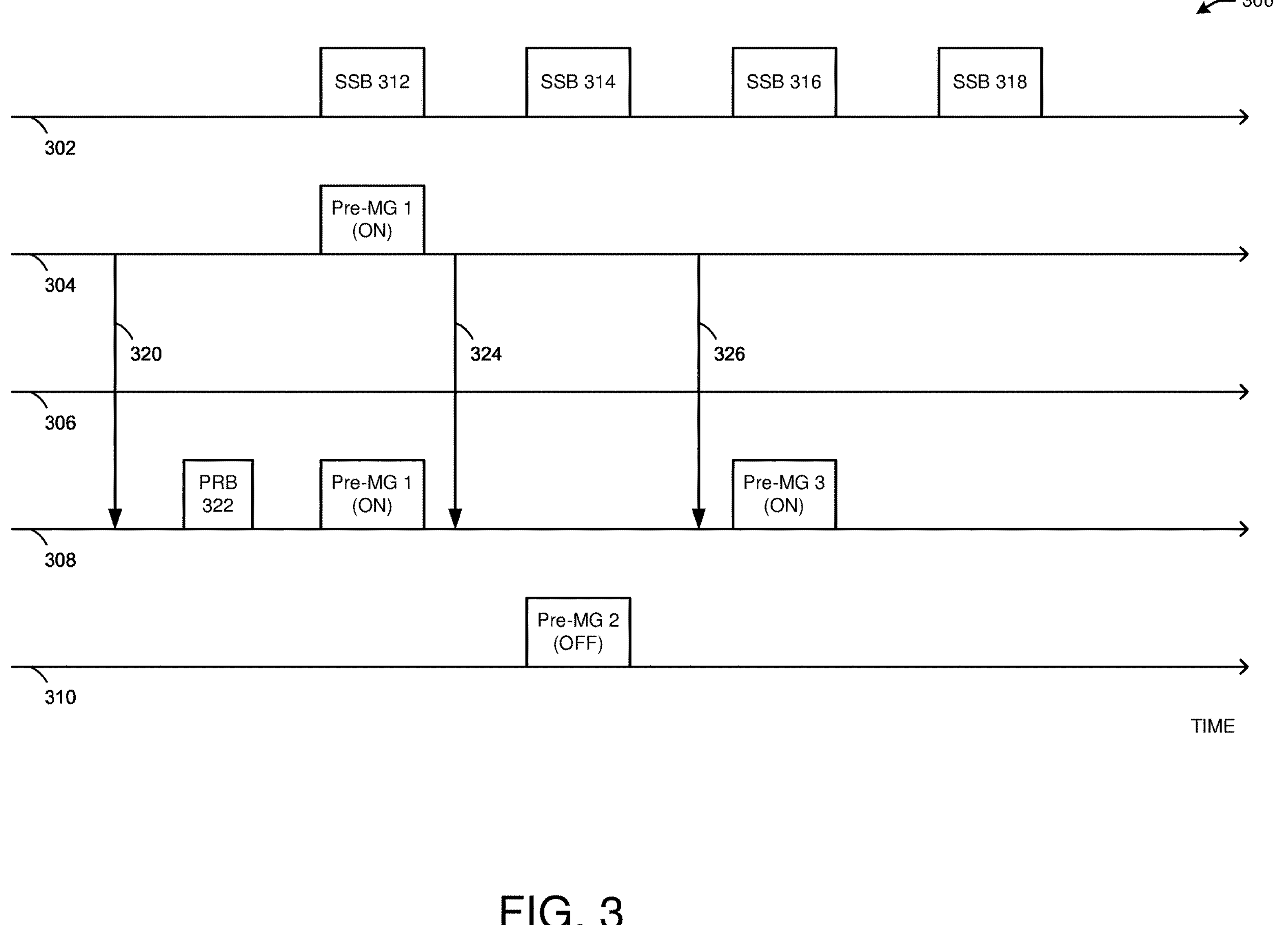
FIG. 3 illustrates an example process of triggering a pre-configured measurement gap activation or deactivation using a secondary cell activation, in accordance with one or more example embodiments of the present disclosure.

FIG. 3 illustrates an example process 300 of triggering a pre-configured measurement gap activation or deactivation using a secondary cell activation, in accordance with one or more example embodiments of the present disclosure.

Referring to FIG. 3, the process 300 may include a UE (e.g., of the UEs 120 of FIG. 1) using a measurement object 302 (e.g., a neighboring cell 1 transmitting at frequency f1), a serving cell 304 (e.g., transmitting at primary cell, frequency f0), a frequency 306, a UE receiving frequency 308 using primary cell, frequency f0, and a UE receiving frequency 310 using secondary cell, frequency f1. The neighboring cell 1 may receive SSBs 312, 314, 316, and 318 (e.g., from the RANs 102 of FIG. 1). The serving cell 304 may indicate 320 to the UE receiving frequency 308 a pre-MG 1 configuration using a RRC configuration indicator. The UE receiving frequency 308 may use an in-BWP PRB 322. During the pre-MG 1, the UE may measure the measurement object 302 with a MG, and the UE may need to measure the secondary cell at frequency f1 deactivated (e.g., without a gap and with a longer cycle such as 640 milliseconds). The serving cell 304 may indicate 324 to the UE receiving frequency 308 that the secondary cell has been activated by a MAC CE. The UE may measure the measurement object 302 with a gap during the SSB 314 (e.g., pre-MG 2). The serving cell 304 may indicate 326 to the UE receiving frequency 308 that the secondary cell has been deactivated by a MAC CE, and the UE may measure the measurement object 302 during the SSB 316 (e.g., pre-MG 3).

Figure 4:
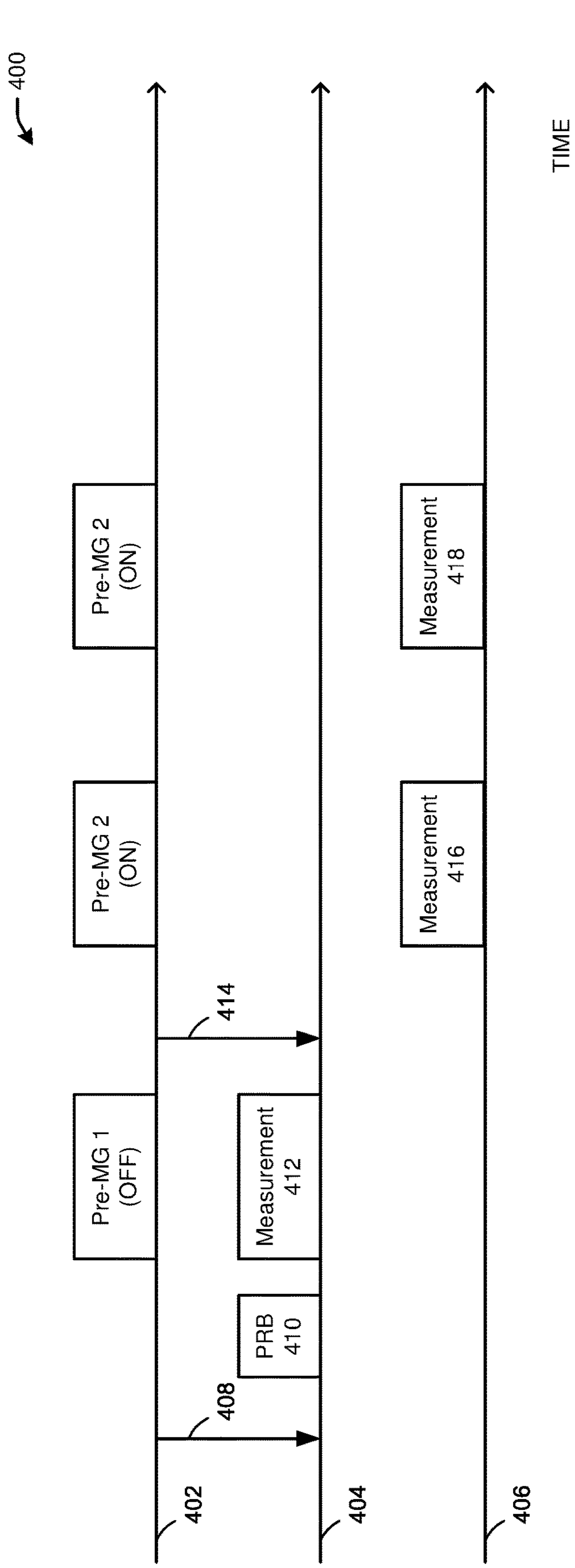
FIG. 4 illustrates an example process of triggering a pre-configured measurement gap activation or deactivation by adding, releasing, or changing a primary cell or a secondary cell, in accordance with one or more example embodiments of the present disclosure.

FIG. 4 illustrates an example process 400 of triggering a pre-configured measurement gap activation or deactivation by adding, releasing, or changing a primary cell or a secondary cell, in accordance with one or more example embodiments of the present disclosure.

Referring to FIG. 4, a UE (e.g., of the UEs 120 of FIG. 1) may use a serving cell 402 at frequency f0, a UE receiving frequency 404 at f0, and a UE receiving frequency 406 at frequency f1. The serving cell 402 may indicate 408 to the UE receiving frequency 404 a pre-MG 1 configuration using a RRC reconfiguration indication. The UE receiving frequency 404 may use an in-BWP PRB 410, and may perform a measurement 412 during the pre-MG 1 without a gap. The serving cell 402 may indicate 414 to the UE receiving frequency 404 a MO reconfiguration using a RRC reconfiguration indicator for pre-MG 2, during which the UE may perform measurement 416 and 418 with a gap on the UE receiving frequency 406.

Figure 5:
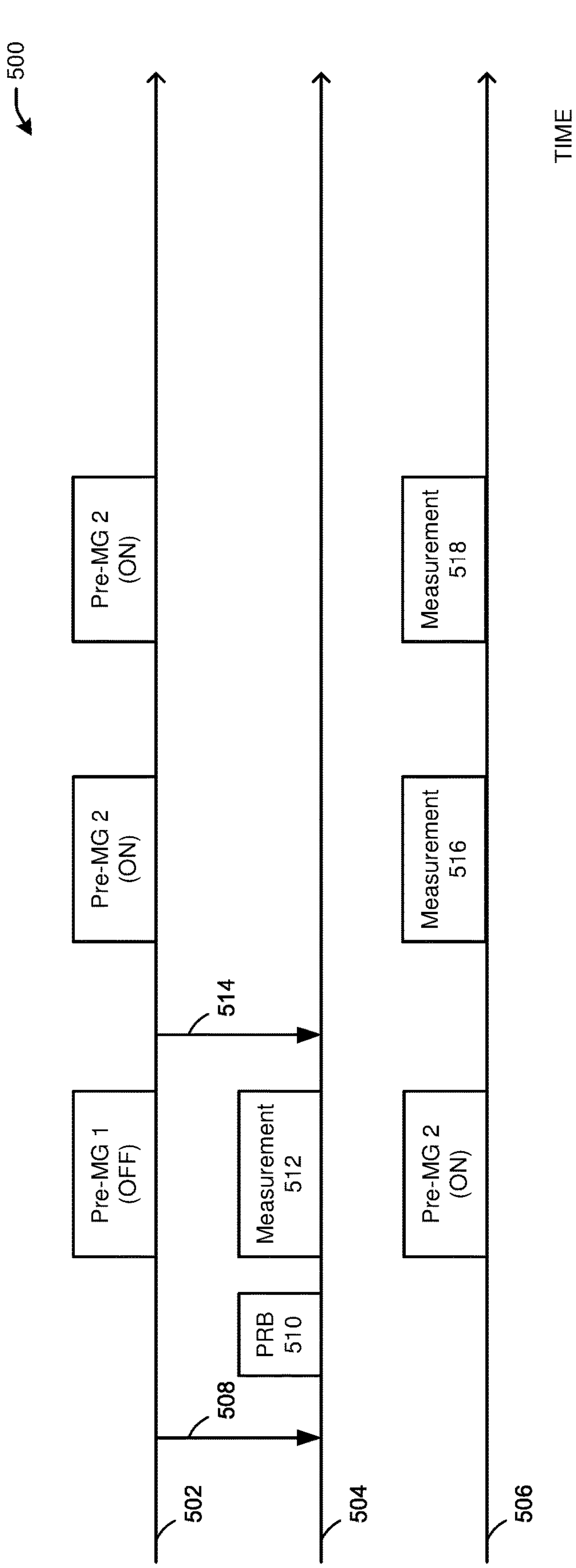
FIG. 5 illustrates an example process of triggering a pre-configured measurement gap activation or deactivation by triggering a user equipment device to check a pre-configured measurement gap status autonomously, in accordance with one or more example embodiments of the present disclosure.

FIG. 5 illustrates an example process 500 of triggering a pre-configured measurement gap activation or deactivation by triggering a user equipment device to check a pre-configured measurement gap status autonomously, in accordance with one or more example embodiments of the present disclosure.

Referring to FIG. 5, a UE (e.g., of the UEs 120 of FIG. 1) may use a serving cell 502 at frequency f0, a UE receiving frequency 504 at f0, and a UE receiving frequency 506 at frequency f1. The serving cell 502 may indicate 508 to the UE receiving frequency 504 a pre-MG 1 configuration using a RRC reconfiguration indication. The UE receiving frequency 504 may use an in-BWP PRB 510, and may perform a measurement 512 during the pre-MG 1 without a gap. The serving cell 502 may indicate 514 to the UE receiving frequency 504 a secondary cell activation by MAC CE. As a result, the UE may perform measurement 516 and 518 with a gap during pre-MG 2 on the UE receiving frequency 506.

FIG. 6A is a table 600 of parameters for Case 4-1, in accordance with one or more example embodiments of the present disclosure.

When SCell activation happens only (e.g., no BWP switching), after a pre-MG has been configured, if MO can be contained by either of PCell or other activated SCells' activated BWP, the pre-MG status can be unchanged.

FIG. 6B is a table 620 of parameters for Case 4-2, in accordance with one or more example embodiments of the present disclosure.

When SCell activation happens only (e.g., no BWP switching), after a pre-MG has been configured, if MO cannot be contained by either of PCell or other activated SCells' activated BWP, the pre-MG activated is needed during the SCell being activated.

When SCell activation happens after a pre-MG is configured, if MO cannot be contained by UE's activated BWP on SCell to be activated, the pre-MG status can be unchanged.

FIG. 6C is a table 640 of parameters for Case 4-3, in accordance with one or more example embodiments of the present disclosure.

When SCell activation happens after a pre-MG has been configured, if MO is not contained by UE's activated BWP in either PCell or other SCells being activated, but by UE's activated BWP in SCell to be activated, the pre-MG activation status can be changed.

FIG. 6D is a table 650 of parameters for Case 5-1, in accordance with one or more example embodiments of the present disclosure.

If a MO can be contained by UE's activated BWP in a PCC, there is not any impact on the pre-MG status from the SCell activation, but only from the activated BWP switching in the PCC.

FIG. 6E is a table 660 of parameters for Case 5-2, in accordance with one or more example embodiments of the present disclosure.

If a MO can be contained by UE's activated BWP in a SCC to be activated, there is impact on the pre-MG status from the SCell activation.

FIG. 6F is a table 670 of parameters for Case 5-3, in accordance with one or more example embodiments of the present disclosure.

If MO cannot be contained by UE's activated BWP in any PCell/SCell kept as activation or to be activated, there will not be an impact on the pre-MG status from the SCell activation.

In case of a CA, the impact from the SCell (de)activation and the BWP switching can trigger the pre-MG status change independently.

Figure 7:
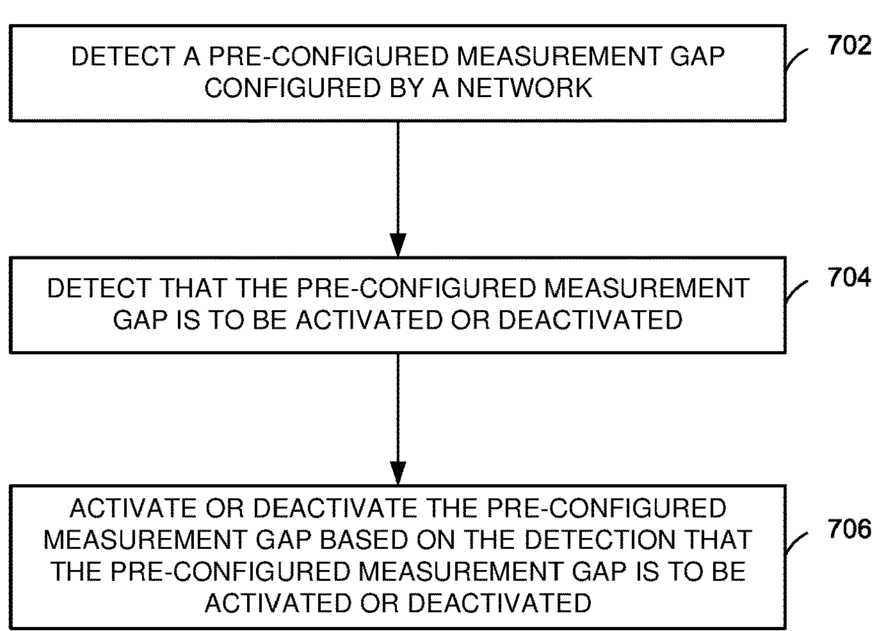
FIG. 7 illustrates a flow diagram of illustrative process for triggering activation or deactivation of a pre-configured measurement gap in wireless communications, in accordance with one or more example embodiments of the present disclosure.

FIG. 7 illustrates a flow diagram of illustrative process 700 for triggering activation or deactivation of a pre-configured measurement gap in wireless communications, in accordance with one or more example embodiments of the present disclosure.

At block 702, a device (e.g., the UEs 120 of FIG. 1, the UE 802 of FIG. 8) may detect a pre-configured measurement gap (pre-MG) configured by a network.

At block 704, the device may detect that the pre-configured measurement gap is to be activated or deactivated. The detection may use any of the techniques described herein.

At block 706, the device may activate or deactivate the pre-configured measurement gap based on the detection that that the pre-configured measurement gap is to be activated or deactivated.

These embodiments are not meant to be limiting.

FIG. 8 illustrates a network 800 in accordance with various embodiments. The network 800 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 800 may include a UE 802, which may include any mobile or non-mobile computing device designed to communicate with a RAN 804 via an over-the-air connection. The UE 802 may be communicatively coupled with the RAN 804 by a Uu interface. The UE 802 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 800 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 802 may additionally communicate with an AP 806 via an over-the-air connection. The AP 806 may manage a WLAN connection, which may serve to offload some/all network traffic from the RAN 804. The connection between the UE 802 and the AP 806 may be consistent with any IEEE 802.11 protocol, wherein the AP 806 could be a wireless fidelity (Wi-Fi®) router. In some embodiments, the UE 802, RAN 804, and AP 806 may utilize cellular-WLAN aggregation (for example, LWA/LWIP). Cellular-WLAN aggregation may involve the UE 802 being configured by the RAN 804 to utilize both cellular radio resources and WLAN resources.

The RAN 804 may include one or more access nodes, for example, AN 808. AN 808 may terminate air-interface protocols for the UE 802 by providing access stratum protocols including RRC, PDCP, RLC, MAC, and LI protocols. In this manner, the AN 808 may enable data/voice connectivity between CN 820 and the UE 802. In some embodiments, the AN 808 may be implemented in a discrete device or as one or more software entities running on server computers as part of, for example, a virtual network, which may be referred to as a CRAN or virtual baseband unit pool. The AN 808 be referred to as a BS, gNB, RAN node, eNB, ng-eNB, NodeB, RSU, TRxP, TRP, etc. The AN 808 may be a macrocell base station or a low power base station for providing femtocells, picocells or other like cells having smaller coverage areas, smaller user capacity, or higher bandwidth compared to macrocells.

In embodiments in which the RAN 804 includes a plurality of ANs, they may be coupled with one another via an X2 interface (if the RAN 804 is an LTE RAN) or an Xn interface (if the RAN 804 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 804 may each manage one or more cells, cell groups, component carriers, etc. to provide the UE 802 with an air interface for network access. The UE 802 may be simultaneously connected with a plurality of cells provided by the same or different ANs of the RAN 804. For example, the UE 802 and RAN 804 may use carrier aggregation to allow the UE 802 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 804 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 802 or AN 808 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 804 may be an LTE RAN 810 with eNBs, for example, eNB 812. The LTE RAN 810 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 804 may be an NG-RAN 814 with gNBs, for example, gNB 816, or ng-eNBs, for example, ng-eNB 818. The gNB 816 may connect with 5G-enabled UEs using a 5G NR interface. The gNB 816 may connect with a 5G core through an NG interface, which may include an N2 interface or an N3 interface. The ng-eNB 818 may also connect with the 5G core through an NG interface, but may connect with a UE via an LTE air interface. The gNB 816 and the ng-eNB 818 may connect with each other over an Xn interface.

In some embodiments, the NG interface may be split into two parts, an NG user plane (NG-U) interface, which carries traffic data between the nodes of the NG-RAN 814 and a UPF 848 (e.g., N3 interface), and an NG control plane (NG-C) interface, which is a signaling interface between the nodes of the NG-RAN 814 and an AMF 844 (e.g., N2 interface).

The NG-RAN 814 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHZ to 52.6 GHZ. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 802 can be configured with multiple BWPs where each BWP configuration has a different SCS. When a BWP change is indicated to the UE 802, the SCS of the transmission is changed as well. Another use case example of BWP is related to power saving. In particular, multiple BWPs can be configured for the UE 802 with different amount of frequency resources (for example, PRBs) to support data transmission under different traffic loading scenarios. A BWP containing a smaller number of PRBs can be used for data transmission with small traffic load while allowing power saving at the UE 802 and in some cases at the gNB 816. A BWP containing a larger number of PRBs can be used for scenarios with higher traffic load.

The RAN 804 is communicatively coupled to CN 820 that includes network elements to provide various functions to support data and telecommunications services to customers/subscribers (for example, users of UE 802). The components of the CN 820 may be implemented in one physical node or separate physical nodes. In some embodiments, NFV may be utilized to virtualize any or all of the functions provided by the network elements of the CN 820 onto physical compute/storage resources in servers, switches, etc. A logical instantiation of the CN 820 may be referred to as a network slice, and a logical instantiation of a portion of the CN 820 may be referred to as a network sub-slice.

In some embodiments, the CN 820 may be an LTE CN 822, which may also be referred to as an EPC. The LTE CN 822 may include MME 824, SGW 826, SGSN 828, HSS 830, PGW 832, and PCRF 834 coupled with one another over interfaces (or "reference points") as shown. Functions of the elements of the LTE CN 822 may be briefly introduced as follows.

The MME 824 may implement mobility management functions to track a current location of the UE 802 to facilitate paging, bearer activation/deactivation, handovers, gateway selection, authentication, etc.

The SGW 826 may terminate an SI interface toward the RAN and route data packets between the RAN and the LTE CN 822. The SGW 826 may be a local mobility anchor point for inter-RAN node handovers and also may provide an anchor for inter-3GPP mobility. Other responsibilities may include lawful intercept, charging, and some policy enforcement.

The SGSN 828 may track a location of the UE 802 and perform security functions and access control. In addition, the SGSN 828 may perform inter-EPC node signaling for mobility between different RAT networks; PDN and S-GW selection as specified by MME 824; MME selection for handovers; etc. The S3 reference point between the MME 824 and the SGSN 828 may enable user and bearer information exchange for inter-3GPP access network mobility in idle/active states.

The HSS 830 may include a database for network users, including subscription-related information to support the network entities' handling of communication sessions. The HSS 830 can provide support for routing/roaming, authentication, authorization, naming/addressing resolution, location dependencies, etc. An S6a reference point between the HSS 830 and the MME 824 may enable transfer of subscription and authentication data for authenticating/authorizing user access to the LTE CN 820.

The PGW 832 may terminate an SGi interface toward a data network (DN) 836 that may include an application/content server 838. The PGW 832 may route data packets between the LTE CN 822 and the data network 836. The PGW 832 may be coupled with the SGW 826 by an S5 reference point to facilitate user plane tunneling and tunnel management. The PGW 832 may further include a node for policy enforcement and charging data collection (for example, PCEF). Additionally, the SGi reference point between the PGW 832 and the data network 836 may be an operator external public, a private PDN, or an intra-operator packet data network, for example, for provision of IMS services. The PGW 832 may be coupled with a PCRF 834 via a Gx reference point.

The PCRF 334 is the policy and charging control element of the LTE CN 822. The PCRF 834 may be communicatively coupled to the app/content server 838 to determine appropriate QoS and charging parameters for service flows. The PCRF 832 may provision associated rules into a PCEF (via Gx reference point) with appropriate TFT and QCI.

In some embodiments, the CN 820 may be a 5GC 840. The 5GC 840 may include an AUSF 842, AMF 844, SMF 846, UPF 848, NSSF 850, NEF 852, NRF 854, PCF 856, UDM 858, and AF 860 coupled with one another over interfaces (or "reference points") as shown. Functions of the elements of the 5GC 840 may be briefly introduced as follows.

The AUSF 842 may store data for authentication of UE 802 and handle authentication-related functionality. The AUSF 842 may facilitate a common authentication framework for various access types. In addition to communicating with other elements of the 5GC 840 over reference points as shown, the AUSF 842 may exhibit an Nausf service-based interface.

The AMF 844 may allow other functions of the 5GC 840 to communicate with the UE 802 and the RAN 804 and to subscribe to notifications about mobility events with respect to the UE 802. The AMF 844 may be responsible for registration management (for example, for registering UE 802), connection management, reachability management, mobility management, lawful interception of AMF-related events, and access authentication and authorization. The AMF 844 may provide transport for SM messages between the UE 802 and the SMF 846, and act as a transparent proxy for routing SM messages. AMF 844 may also provide transport for SMS messages between UE 802 and an SMSF. AMF 844 may interact with the AUSF 842 and the UE 802 to perform various security anchor and context management functions. Furthermore, AMF 844 may be a termination point of a RAN CP interface, which may include or be an N2 reference point between the RAN 804 and the AMF 844; and the AMF 844 may be a termination point of NAS (N1) signaling, and perform NAS ciphering and integrity protection. AMF 844 may also support NAS signaling with the UE 802 over an N3 IWF interface.

The SMF 846 may be responsible for SM (for example, session establishment, tunnel management between UPF 848 and AN 808); UE IP address allocation and management (including optional authorization); selection and control of UP function; configuring traffic steering at UPF 848 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 844 over N2 to AN 808; and determining SSC mode of a session. SM may refer to management of a PDU session, and a PDU session or "session" may refer to a PDU connectivity service that provides or enables the exchange of PDUs between the UE 802 and the data network 836.

The UPF 848 may act as an anchor point for intra-RAT and inter-RAT mobility, an external PDU session point of interconnect to data network 836, and a branching point to support multi-homed PDU session. The UPF 848 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 348 may include an uplink classifier to support routing traffic flows to a data network.

The NSSF 850 may select a set of network slice instances serving the UE 802. The NSSF 850 may also determine allowed NSSAI and the mapping to the subscribed S-NSSAIs, if needed. The NSSF 850 may also determine the AMF set to be used to serve the UE 802, or a list of candidate AMFs based on a suitable configuration and possibly by querying the NRF 854. The selection of a set of network slice instances for the UE 802 may be triggered by the AMF 844 with which the UE 802 is registered by interacting with the NSSF 850, which may lead to a change of AMF. The NSSF 350 may interact with the AMF 844 via an N22 reference point; and may communicate with another NSSF in a visited network via an N31 reference point (not shown). Additionally, the NSSF 850 may exhibit an Nnssf service-based interface.

The NEF 852 may securely expose services and capabilities provided by 3GPP network functions for third party, internal exposure/re-exposure, AFs (e.g., AF 860), edge computing or fog computing systems, etc. In such embodiments, the NEF 852 may authenticate, authorize, or throttle the AFs. NEF 852 may also translate information exchanged with the AF 860 and information exchanged with internal network functions. For example, the NEF 852 may translate between an AF-Service-Identifier and an internal 5GC information. NEF 852 may also receive information from other NFs based on exposed capabilities of other NFs. This information may be stored at the NEF 852 as structured data, or at a data storage NF using standardized interfaces. The stored information can then be re-exposed by the NEF 852 to other NFs and AFs, or used for other purposes such as analytics. Additionally, the NEF 852 may exhibit an Nnef service-based interface.

The NRF 854 may support service discovery functions, receive NF discovery requests from NF instances, and provide the information of the discovered NF instances to the NF instances. NRF 854 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 854 may exhibit the Nnrf service-based interface.

The PCF 856 may provide policy rules to control plane functions to enforce them, and may also support unified policy framework to govern network behavior. The PCF 856 may also implement a front end to access subscription information relevant for policy decisions in a UDR of the UDM 858. In addition to communicating with functions over reference points as shown, the PCF 856 exhibit an Npcf service-based interface.

The UDM 858 may handle subscription-related information to support the network entities' handling of communication sessions, and may store subscription data of UE 802. For example, subscription data may be communicated via an N8 reference point between the UDM 858 and the AMF 844. The UDM 858 may include two parts, an application front end and a UDR. The UDR may store subscription data and policy data for the UDM 858 and the PCF 856, and/or structured data for exposure and application data (including PFDs for application detection, application request information for multiple UEs 802) for the NEF 852. The Nudr service-based interface may be exhibited by the UDR 821 to allow the UDM 858, PCF 856, and NEF 852 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 358 may exhibit the Nudm service-based interface.

The AF 860 may provide application influence on traffic routing, provide access to NEF, and interact with the policy framework for policy control.

In some embodiments, the 5GC 840 may enable edge computing by selecting operator/3$^{rd}$ party services to be geographically close to a point that the UE 802 is attached to the network. This may reduce latency and load on the network. To provide edge-computing implementations, the 5GC 840 may select a UPF 848 close to the UE 802 and execute traffic steering from the UPF 848 to data network 836 via the N6 interface. This may be based on the UE subscription data, UE location, and information provided by the AF 860. In this way, the AF 860 may influence UPF (re)selection and traffic routing. Based on operator deployment, when AF 860 is considered to be a trusted entity, the network operator may permit AF 860 to interact directly with relevant NFs. Additionally, the AF 860 may exhibit an Naf service-based interface.

The data network 836 may represent various network operator services, Internet access, or third party services that may be provided by one or more servers including, for example, application/content server 838.

FIG. 9 schematically illustrates a wireless network 900 in accordance with various embodiments. The wireless network 900 may include a UE 902 in wireless communication with an AN 904. The UE 902 and AN 904 may be similar to, and substantially interchangeable with, like-named components described elsewhere herein.

The UE 902 may be communicatively coupled with the AN 904 via connection 906. The connection 906 is illustrated as an air interface to enable communicative coupling, and can be consistent with cellular communications protocols such as an LTE protocol or a 5G NR protocol operating at mmWave or sub-6 GHZ frequencies.

The UE 902 may include a host platform 908 coupled with a modem platform 910. The host platform 908 may include application processing circuitry 912, which may be coupled with protocol processing circuitry 914 of the modem platform 910. The application processing circuitry 912 may run various applications for the UE 902 that source/sink application data. The application processing circuitry 912 may further implement one or more layer operations to transmit/receive application data to/from a data network. These layer operations may include transport (for example UDP) and Internet (for example, IP) operations.

The protocol processing circuitry 914 may implement one or more of layer operations to facilitate transmission or reception of data over the connection 906. The layer operations implemented by the protocol processing circuitry 914 may include, for example, MAC, RLC, PDCP, RRC and NAS operations.

The modem platform 910 may further include digital baseband circuitry 916 that may implement one or more layer operations that are "below" layer operations performed by the protocol processing circuitry 914 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 910 may further include transmit circuitry 418, receive circuitry 920, RF circuitry 922, and RF front end (RFFE) 924, which may include or connect to one or more antenna panels 926. Briefly, the transmit circuitry 918 may include a digital-to-analog converter, mixer, intermediate frequency (IF) components, etc.; the receive circuitry 920 may include an analog-to-digital converter, mixer, IF components, etc.; the RF circuitry 922 may include a low-noise amplifier, a power amplifier, power tracking components, etc.; RFFE 924 may include filters (for example, surface/bulk acoustic wave filters), switches, antenna tuners, beamforming components (for example, phase-array antenna components), etc. The selection and arrangement of the components of the transmit circuitry 918, receive circuitry 920, RF circuitry 922, RFFE 924, and antenna panels 926 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 914 may include one or more instances of control circuitry (not shown) to provide control functions for the transmit/receive components.

A UE reception may be established by and via the antenna panels 926, RFFE 924, RF circuitry 922, receive circuitry 920, digital baseband circuitry 916, and protocol processing circuitry 914. In some embodiments, the antenna panels 926 may receive a transmission from the AN 904 by receive-beamforming signals received by a plurality of antennas/antenna elements of the one or more antenna panels 926.

A UE transmission may be established by and via the protocol processing circuitry 914, digital baseband circuitry 916, transmit circuitry 918, RF circuitry 922, RFFE 924, and antenna panels 926. In some embodiments, the transmit components of the UE 904 may apply a spatial filter to the data to be transmitted to form a transmit beam emitted by the antenna elements of the antenna panels 926.

Similar to the UE 902, the AN 904 may include a host platform 928 coupled with a modem platform 930. The host platform 928 may include application processing circuitry 932 coupled with protocol processing circuitry 934 of the modem platform 930. The modem platform may further include digital baseband circuitry 936, transmit circuitry 938, receive circuitry 940, RF circuitry 942, RFFE circuitry 944, and antenna panels 946. The components of the AN 904 may be similar to and substantially interchangeable with like-named components of the UE 902. In addition to performing data transmission/reception as described above, the components of the AN 908 may perform various logical functions that include, for example, RNC functions such as radio bearer management, uplink and downlink dynamic radio resource management, and data packet scheduling.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040 or other interface circuitry. For embodiments where node virtualization (e.g., NFV) is utilized, a hypervisor 1002 may be executed to provide an execution environment for one or more network slices/sub-slices to utilize the hardware resources 1000.

The processors 1010 may include, for example, a processor 1012 and a processor 1014. The processors 1010 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1020 may include main memory, disk storage, or any suitable combination thereof. The memory/storage devices 1020 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1030 may include interconnection or network interface controllers, components, or other suitable devices to communicate with one or more peripheral devices 1004 or one or more databases 1006 or other network elements via a network 1008. For example, the communication resources 1030 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

The following examples pertain to further embodiments.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The word “exemplary” is used herein to mean “serving as an example, instance, or illustration.” Any embodiment described herein as “exemplary” is not necessarily to be construed as preferred or advantageous over other embodiments. The terms “computing device,” “user device,” “communication station,” “station,” “handheld device,” “mobile device,” “wireless device” and “user equipment” (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term “communicate” is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as “communicating,” when only the functionality of one of those devices is being claimed. The term “communicating” as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives “first,” “second,” “third,” etc., to describe a common object, merely indicates that different instances of like objects are being referred to and are not intended to imply that the objects so described must be in a given sequence, either temporally, spatially, in ranking, or in any other manner.

The term “access point” (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Various embodiments are described below.

Example 1 may include an apparatus of a user equipment device (UE) device for activating and deactivating pre-configured measurement gaps in carrier aggregation, the apparatus comprising processing circuitry coupled to storage for storing information associated with the pre-configured measurement gaps, the processing circuitry configured to: detect a pre-configured measurement gap configured by a network; detect that the pre-configured measurement gap is to be activated or deactivated; and activate or deactivate the pre-configured measurement gap based on the detection that the pre-configured measurement gap is to be activated or deactivated.

Example 2 may include the apparatus of example 1, wherein the processing circuitry is further configured to: detect an addition or removal of a measurement object associated with the pre-configured measurement gap, wherein to detect that the pre-configured measurement gap is to be activated or deactivated is based on the detection of the addition or removal of the measurement object.

Example 3 may include The apparatus of example 2, wherein the processing circuitry is further configured to: detect a network-controlled activation or deactivation indication based on a radio resource control (RRC)

measurement gap list from the network, wherein to detect that the pre-configured measurement gap is to be activated or deactivated is based on the detection of the network-controlled activation or deactivation indication.

Example 4 may include the apparatus of example 3, wherein the RRC measurement gap list comprises an indication of a measurement object change.

Example 5 may include the apparatus of claim 3, wherein the RRC measurement gap list cannot be reconfigured and updated by the network with a measurement object change.

Example 6 may include the apparatus of example 2, wherein the processing circuitry is further configured to: identify, autonomously, a status of the pre-configured measurement gap, wherein to detect that the pre-configured measurement gap is to be activated or deactivated is based on the autonomous identification of the status.

Example 7 may include the apparatus of example 1, wherein the processing circuitry is further configured to: detect an activation or deactivation of a secondary cell, wherein to detect that the pre-configured measurement gap is to be activated or deactivated is based on the detection of the activation or deactivation of the secondary cell.

Example 8 may include the apparatus of example 7, wherein the processing circuitry is further configured to: detect that a status of the pre-configured measurement gap is to be updated based on whether a measurement object's frequency layer is contained by a bandwidth part activated by a primary cell or a secondary cell of the UE, wherein to detect that the pre-configured measurement gap is to be activated or deactivated is based on the detection that the status of the pre-configured measurement gap is to be updated.

Example 9 may include the apparatus of example 7, wherein the activation or deactivation of the secondary cell is based on a medium access control (MAC) control element.

Example 10 may include the apparatus of example 7, wherein the UE is not required to identify a status of the pre-configured measurement gap autonomously.

Example 11 may include the apparatus of example 10, wherein the processing circuitry is further configured to: detect that the network reconfigured and updated the pre-configured measurement gap status based on a RRC indication for an addition, release, or change of a primary cell or a secondary cell, wherein to detect that the pre-configured measurement gap is to be activated or deactivated is based on the detection that the network reconfigured and updated the pre-configured measurement gap status.

Example 12 may include the apparatus of example 7, wherein the UE is required to identify a status of the pre-configured measurement gap autonomously.

Example 13 may include the apparatus of example 12, wherein a RRC indication associated with the pre-configured measurement gap cannot be reconfigured and updated by the network with a measurement object change.

Example 14 a computer-readable storage medium comprising instructions to cause processing circuitry of a user equipment device (UE) for activating and deactivating pre-configured measurement gaps in carrier aggregation, upon execution of the instructions by the processing circuitry, to: detect a pre-configured measurement gap configured by a network; detect that the pre-configured measurement gap is to be activated or deactivated; and activate or deactivate the pre-configured measurement gap based on the detection that the pre-configured measurement gap is to be activated or deactivated.

Example 15 may include the computer-readable medium of example 14, wherein execution of the instructions further causes the processing circuitry to: detect an addition or removal of a measurement object associated with the pre-configured measurement gap, wherein to detect that the pre-configured measurement gap is to be activated or deactivated is based on the detection of the addition or removal of the measurement object.

Example 16 may include the computer-readable medium of example 15, wherein execution of the instructions further causes the processing circuitry to: detect a network-controlled activation or deactivation indication based on a radio resource control (RRC) measurement gap list from the network, wherein to detect that the pre-configured measurement gap is to be activated or deactivated is based on the detection of the network-controlled activation or deactivation indication.

Example 17 may include the computer-readable medium of example 15, wherein execution of the instructions further causes the processing circuitry to: identify, autonomously, a status of the pre-configured measurement gap, wherein to detect that the pre-configured measurement gap is to be activated or deactivated is based on the autonomous identification of the status.

Example 18 may include the computer-readable medium of example 14, wherein execution of the instructions further causes the processing circuitry to: detect an activation or deactivation of a secondary cell, wherein to detect that the pre-configured measurement gap is to be activated or deactivated is based on the detection of the activation or deactivation of the secondary cell.

Example 19 may include the apparatus of example 1, wherein the processing circuitry is further configured to: detect an addition or removal of a measurement object associated with the pre-configured measurement gap, wherein to detect that the pre-configured measurement gap is to be activated or deactivated is based on the detection of the addition or removal of the measurement object.

Example 20 may include an apparatus of a network device for activating and deactivating, for a user equipment device, pre-configured measurement gaps in carrier aggregation, the apparatus comprising processing circuitry coupled to storage for storing information associated with the pre-configured measurement gaps, the processing circuitry configured to: generate an activation or deactivation of a pre-configured measurement gap; and encode radio resource control (RRC) signaling indicative of the activation or deactivation of the pre-configured measurement gap to transmit to the user equipment device.

Example 21 may include a method for activating and deactivating pre-configured measurement gaps in carrier aggregation, the method comprising: detecting, by processing circuitry of a user equipment device (UE), a pre-configured measurement gap configured by a network; detecting, by the processing circuitry, that the pre-configured measurement gap is to be activated or deactivated; and activating or deactivating, by the processing circuitry, the pre-configured measurement gap based on the detection that the pre-configured measurement gap is to be activated or deactivated.

Example 22 may include the method of example 21, further comprising: detecting an addition or removal of a measurement object associated with the pre-configured measurement gap, wherein detecting that the pre-configured measurement gap is to be activated or deactivated is based on the detection of the addition or removal of the measurement object.

Example 23 may include the method of example 22, further comprising: detecting a network-controlled activation or deactivation indication based on a radio resource control (RRC) measurement gap list from the network, wherein detecting that the pre-configured measurement gap is to be activated or deactivated is based on the detection of the network-controlled activation or deactivation indication.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

Unless used differently herein, terms, definitions, and abbreviations may be consistent with terms, definitions, and abbreviations defined in 3GPP TR 21.905 v16.0.0 (2019-06) and/or any other 3GPP standard. For the purposes of the present document, the following abbreviations (shown in Table 9) may apply to the examples and embodiments discussed herein.

TABLE 9

| Abbreviations: | |
|---|---|
| 3GPP | Third Generation Partnership Project |
| 4G | Fourth Generation |
| 5G | Fifth Generation |
| 5GC | 5G Core network |
| AC | Application Client |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CFRA | Contention Free Random Access |
| CG | Cell Group |
| CGF | Charging Gateway Function |
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |

TABLE 9-continued

| Abbreviations: | |
|---|---|
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance tableManagement Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink |

TABLE 9-continued

| Abbreviations: | |
|---|---|
| | Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |

TABLE 9-continued

| Abbreviations: | |
|---|---|
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN |
| | Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |

TABLE 9-continued

| Abbreviations: | |
|---|---|
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |

TABLE 9-continued

| Abbreviations: | |
|---|---|
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |

TABLE 9-continued

| Abbreviations: | |
|---|---|
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |

TABLE 9-continued

| Abbreviations: | |
|---|---|
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH | Block |
| SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |

TABLE 9-continued

| Abbreviations: | |
|---|---|
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Po |

What is claimed is:

1. An apparatus of a user equipment device (UE) device for activating and deactivating pre-configured measurement gaps in carrier aggregation, the apparatus comprising processing circuitry coupled to storage for storing information associated with the pre-configured measurement gaps, the processing circuitry configured to:

detect a pre-configured measurement gap configured by a network;

detect that the pre-configured measurement gap is to be activated or deactivated; and activate or deactivate the pre-configured measurement gap based on the detection that the pre-configured measurement gap is to be activated or deactivated, wherein the processing circuitry is configured to determine a status of the pre-configured measurement gap based on whether a measurement object's frequency layer is contained by a bandwidth part (BWP) activated by a primary cell or an activated secondary cell of the UE.

2. The apparatus of claim 1, wherein the processing circuitry is further configured to:

detect an addition or removal of a measurement object associated with the pre-configured measurement gap, wherein to detect that the pre-configured measurement gap is to be activated or deactivated is based on the detection of the addition or removal of the measurement object.

3. The apparatus of claim 2, wherein the processing circuitry is further configured to:

detect a network-controlled activation or deactivation indication based on a radio resource control (RRC) measurement gap list from the network, wherein to detect that the pre-configured measurement gap is to be activated or deactivated is based on the detection of the network-controlled activation or deactivation indication.

4. The apparatus of claim 3, wherein the RRC measurement gap list comprises an indication of a measurement object change.

5. The apparatus of claim 3, wherein the RRC measurement gap list cannot be reconfigured and updated by the network with a measurement object change.

6. The apparatus of claim 2, wherein the processing circuitry is further configured to:

identify, autonomously, a status of the pre-configured measurement gap, wherein to detect that the pre-configured measurement gap is to be activated or deactivated is based on the autonomous identification of the status.

7. The apparatus of claim 1, wherein the processing circuitry is further configured to:

detect an activation or deactivation of a secondary cell, wherein to detect that the pre-configured measurement gap is to be activated or deactivated is based on the detection of the activation or deactivation of the secondary cell.

8. The apparatus of claim 7, wherein the processing circuitry is configured to update the status of the pre-configured measurement gap based on whether the measurement object's frequency layer is contained by the bandwidth part activated by the primary cell or the secondary cell of the UE.

9. The apparatus of claim 7, wherein the activation or deactivation of the secondary cell is based on a medium access control (MAC) control element.

10. The apparatus of claim 7, wherein the UE is not required to identify a status of the pre-configured measurement gap autonomously.

11. The apparatus of claim 10, wherein the processing circuitry is further configured to:

detect that the network reconfigured and updated the pre-configured measurement gap status based on a RRC indication for an addition, release, or change of a primary cell or a secondary cell, wherein to detect that the pre-configured measurement gap is to be activated or deactivated is based on the detection that the network reconfigured and updated the pre-configured measurement gap status.

12. The apparatus of claim 7, wherein the UE is required to identify a status of the pre-configured measurement gap autonomously.

13. The apparatus of claim 12, wherein a RRC indication associated with the pre-configured measurement gap cannot be reconfigured and updated by the network with a measurement object change.

14. A non-transitory computer-readable storage medium comprising instructions to cause processing circuitry of a user equipment device (UE) for activating and deactivating pre-configured measurement gaps in carrier aggregation, upon execution of the instructions by the processing circuitry, to:

detect a pre-configured measurement gap configured by a network;

detect that the pre-configured measurement gap is to be activated or deactivated; and activate or deactivate the pre-configured measurement gap based on the detection that the pre-configured measurement gap is to be activated or deactivated, wherein the processing circuitry is configured to determine a status of the pre-configured measurement gap based on whether a measurement object's frequency layer is contained by a bandwidth part (BWP) activated by a primary cell or an activated secondary cell of the UE.

15. The non-transitory computer-readable medium of claim 14, wherein execution of the instructions further causes the processing circuitry to:

detect an addition or removal of a measurement object associated with the pre-configured measurement gap, wherein to detect that the pre-configured measurement gap is to be activated or deactivated is based on the detection of the addition or removal of the measurement object.

16. The non-transitory computer-readable medium of claim 15, wherein execution of the instructions further causes the processing circuitry to:

detect a network-controlled activation or deactivation indication based on a radio resource control (RRC) measurement gap list from the network, wherein to detect that the pre-configured measurement gap is to be activated or deactivated is based on the detection of the network-controlled activation or deactivation indication.

17. The non-transitory computer-readable medium of claim 15, wherein execution of the instructions further causes the processing circuitry to:

identify, autonomously, a status of the pre-configured measurement gap, wherein to detect that the pre-configured measurement gap is to be activated or deactivated is based on the autonomous identification of the status.

18. The non-transitory computer-readable medium of claim 14, wherein execution of the instructions further causes the processing circuitry to:

detect an activation or deactivation of a secondary cell, wherein to detect that the pre-configured measurement gap is to be activated or deactivated is based on the detection of the activation or deactivation of the secondary cell.

19. A method for activating and deactivating pre-configured measurement gaps in carrier aggregation, the method comprising:

detecting, by processing circuitry of a user equipment device (UE), a pre-configured measurement gap configured by a network;

detecting, by the processing circuitry, that the pre-configured measurement gap is to be activated or deactivated; and activating or deactivating, by the processing circuitry, the pre-configured measurement gap based on the detection that the pre-configured measurement gap is to be activated or deactivated, wherein the processing circuitry is configured to determine a status of the pre-configured measurement gap based on whether a measurement object's frequency layer is contained by a bandwidth part (BWP) activated by a primary cell or an activated secondary cell of the UE.

20. The method of claim 19, further comprising:

detecting an addition or removal of a measurement object associated with the pre-configured measurement gap, wherein detecting that the pre-configured measurement gap is to be activated or deactivated is based on the detection of the addition or removal of the measurement object.

* * * * *